(No Model.)

C. A. BEHLEN.
RUNNING GEAR FOR VEHICLES.

No. 380,078. Patented Mar. 27, 1888.

Attest
W. Ellwood Wynne
Theo. H. Medder.

Inventor
Charles A. Behlen,
by Jere. S. Irwin Atty.

N. PETERS. Photo-Lithographer, Washington, D.C.

UNITED STATES PATENT OFFICE.

CHARLES A. BEHLEN, OF CINCINNATI, OHIO.

RUNNING-GEAR FOR VEHICLES.

SPECIFICATION forming part of Letters Patent No. 380,078, dated March 27, 1888.

Application filed December 12, 1887. Serial No. 257,637. (No model.)

*To all whom it may concern:*

Be it known that I, CHARLES A. BEHLEN, a citizen of the United States, residing at Cincinnati, in the county of Hamilton and State of Ohio, have invented a certain new and useful Improvement in the Running-Gear for Vehicles, of which the following is a specification.

My invention relates to the running-gear for vehicles, but more particularly to the fifth-wheel thereof, and the advantages will be readily perceived and understood from the description I am about to give, and by reference to the accompanying drawings, forming part of my application, in which—

Figure 1:
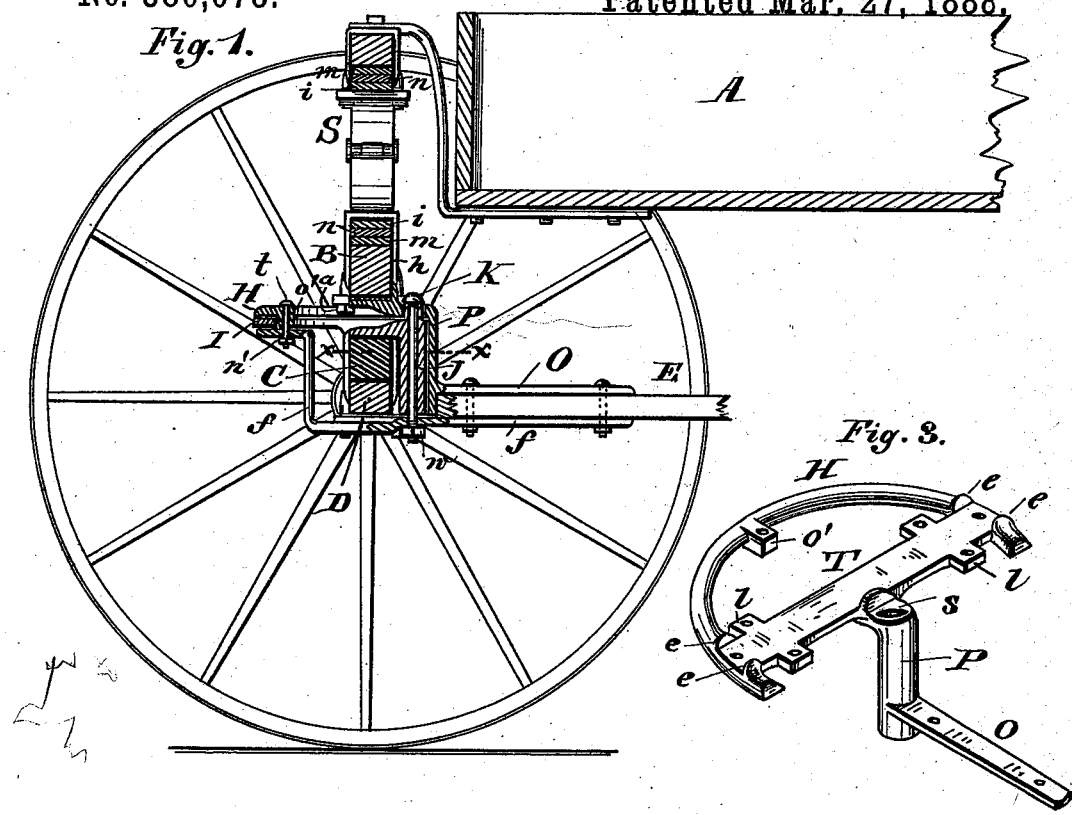
Figure 3:
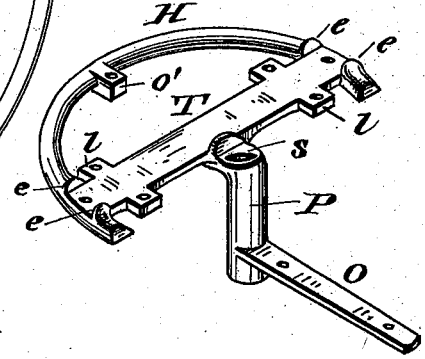
Figure 2:
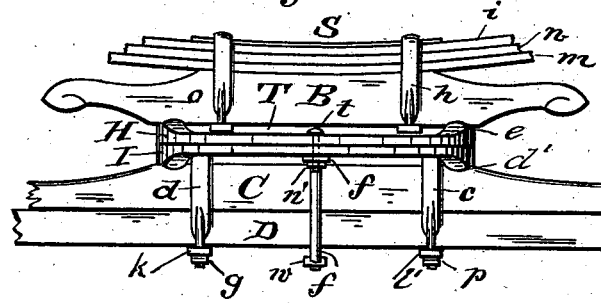
Figure 4:
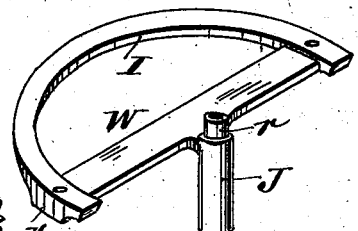
Figure 5:
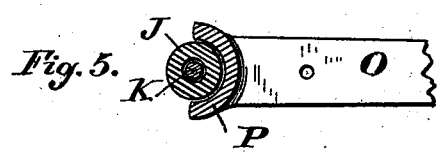

Figure 1 is a central longitudinal section taken through the front part of a buggy, the rear portion of which is cut away. Fig. 2 is a front view of the spring, head-block, fifth-wheel, axle-bed, and axle, the whole being held together by the ordinary clips and bolts. Figs. 3 and 4 are enlarged perspective view of the bottom and top plates and their accessorial parts, which, as a whole, compose my fifth-wheel. Fig. 5 is a horizontal cross-sectional view taken through that portion of the fifth-wheel where its two parts are joined together, as indicated by the line $x$ $x$, Fig. 1.

The letter A indicates the body of the vehicle, which is hung in the usual manner to the spring S, which in this instance is an ordinary elliptic three-leaved spring, the leaves being indicated by the letters $i$, $n$, and $m$. As represented in the drawings, the body appears in its unloaded condition—that is, when no weight is being carried.

B indicates the head-block of the vehicle, and C the axle-bed, while D is the axle itself.

E is the perch, while $f$ is the perch-plate and fifth-wheel stay combined.

H and I are the two parts which compose my fifth-wheel, H being the upper and I the lower. H is attached to the head-block B by means of the ordinary clips, $o$ $h$, which also embrace the spring S and hold it firmly in position on the head-block. The ends of the clips pass through the lugs $l$ $l$ on cross-plate T, and are there held by nuts $a$, as indicated. The ears $e$ $e$ on each end of the plate T are for the purpose of holding the head-block securely in position in conjunction with the clips $o$ $h$.

Integrally united to the cross-plate T is a hollow-necked shank, P, which in turn has connected to it a plate, O, designed for attachment to the perch E in any proper manner, as by rivets, as shown in Fig. 1. The end of this shank P rests on the perch-plate $f$, as illustrated.

Underneath the top portion of my fifth-wheel fits the part I, which also has a cross-plate, W, designed to rest on the top portion of axle-bed C, and it is provided with ears similar to plate T and for the same purpose. By means of the clips $d$ $c$, embracing plate W, nuts $g$ $p$, and supporting metal cross-plates $k$ $l'$, the axle, axle-bed, and the lower part of my fifth-wheel are firmly and securely held together in their respective positions.

Integrally united to the plate W is a straight tubular shank, J, whose exterior conforms to the shape of the hollow in shank P. The top of this shank P is provided with a bearing, $r$, whose diameter is such that it will snugly fit in the aperture $s$ of the necked shank P. This will bring them into operative connection with one another, and the king-bolt K can be inserted through the parts and secured by the nut $w$, as shown in Figs. 1 and 5. The use of this king-bolt is not a real necessity, for when the parts are fastened together, as herein described, and as illustrated in the drawings, sufficient strength for all ordinary purposes is secured, and the operation will not in any manner be defective; but as a precautionary measure it is deemed advisable to use the king-bolt.

As before stated, the fifth-wheel stay is illustrated by the letter $f$, and is attached to the upper plate, H, by means of a bolt, $t$, passing through a lug or offset, $o'$, on the plate, and is secured by the nut $n'$.

Among the advantages derived from the use of a fifth-wheel such as I have shown and described may be mentioned the following: The axle and head-block can be brought close to the perch, be it single or double, and fitted snugly, by reason of the "hollowing out" or concavity in the necked shank P and running into this concavity the shank J.

I am enabled to hang the body rather low, so as to be convenient for ingress and egress, and provide for a sufficiency of stretch or sink when the vehicle is loaded—that is to say, the body being hung close to the spring and head-block, but just far enough to clear the necked shank P, when a heavy load is being carried the body is allowed to fall as low as the springs will permit it or until it strikes the perch. These features are important, in that they add to the compactness and finish of the vehicle and are not possessed by any other vehicle in use. In addition to these, the simplicity of constructing my gear, the ease with which it can be put together, and the strength acquired thereby will readily recommend its adoption.

What I claim as new, and desire to secure by Letters Patent, is—

1. In the running-gear for vehicles, a fifth-wheel composed of upper and lower semicircular plates, H I, the former being provided with a depending necked hollow shank, P, and attaching perch-plate O, while the latter has a tubular shank, J, to operate within the hollow of necked shank P, in combination with perch E, combined perch-plate and fifth-wheel stay f, the axle, axle-bed, head-block, and spring, the whole being fastened together, substantially as shown and described, for the purposes specified.

2. In the running-gear of vehicles, a fifth-wheel composed of upper and lower semicircular plates, H I, the former being provided with a depending necked hollow shank, P, having attaching perch-plate O, while the latter has a tubular shank, J, to fit and operate within the cavity of necked shank P, the two being connected by king-bolt K and nut w, in combination with perch E, combined perch-plate and fifth-wheel stay f, the axle, axle-bed, head-block, and spring, the whole being united, substantially as shown and described, and for the purposes specified.

3. In the running-gear of vehicles, a fifth-wheel composed of upper and lower parts, H I, the former being provided with a depending necked hollow shank, P, and integral perch-plate O, while the latter has a tubular shank, J, to fit and operate in the cavity of necked shank P, in combination with the body A, perch E, combined perch-plate and fifth-wheel stay f, the axle-bed, axle, head-block, and spring, the whole being arranged and united as shown and described, and for the purposes noted.

CHAS. A. BEHLEN.

Witnesses:
   CHARLES LEHMER,
   JERE. F. TWOHIG.